Figure 1:
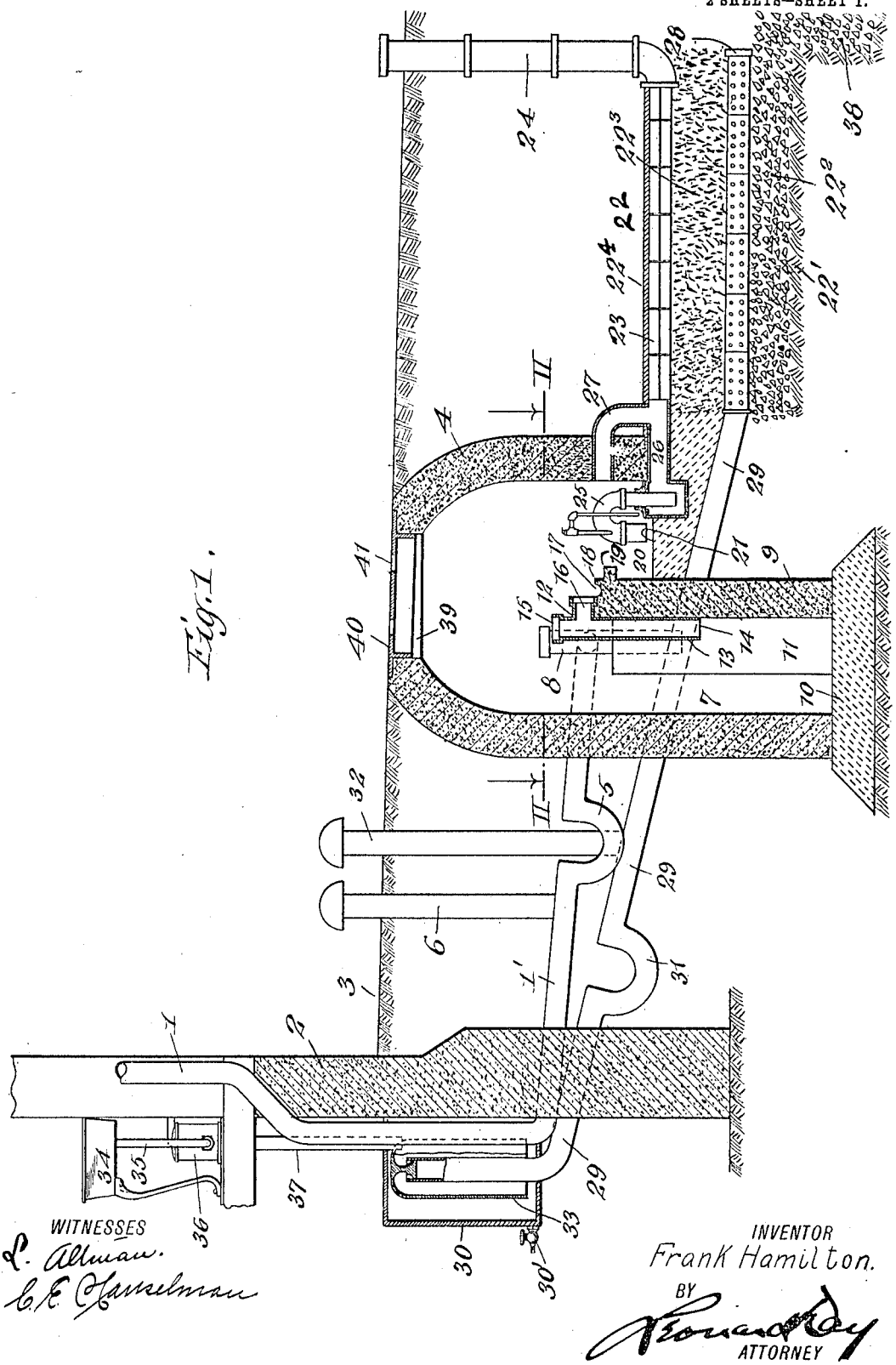

F. HAMILTON.
VENTILATION AND AERATION OF SEWAGE IN SEWAGE PLANTS.
APPLICATION FILED FEB. 24, 1909.

947,333.

Patented Jan. 25, 1910.

2 SHEETS—SHEET 1.

WITNESSES

INVENTOR
Frank Hamilton.
BY
ATTORNEY

F. HAMILTON.
VENTILATION AND AERATION OF SEWAGE IN SEWAGE PLANTS.
APPLICATION FILED FEB. 24, 1909.

947,333.

Patented Jan. 25, 1910.

2 SHEETS—SHEET 2.

WITNESSES

INVENTOR
Frank Hamilton.
BY
ATTORNEY

UNITED STATES PATENT OFFICE.

FRANK HAMILTON, OF JAMAICA, NEW YORK.

VENTILATION AND AERATION OF SEWAGE IN SEWAGE PLANTS.

947,333.  Specification of Letters Patent.  Patented Jan. 25, 1910.

Application filed February 24, 1909. Serial No. 479,793.

*To all whom it may concern:*

Be it known that I, FRANK HAMILTON, a citizen of the United States, and a resident of Jamaica, Long Island, county of Queens, and State of New York, have invented certain new and useful Improvements in the Ventilation and Aeration of Sewage in Sewerage Plants, as set forth in the following specification.

This invention relates to a system and to the apparatus for the purification of sewage and is especially adapted for use in the purification of the sewage of individual dwelling houses rather than that of municipalities.

In general this system of sewage purification is that known as the "Cameron" system, employing successively two kinds of micro-organisms known as anaerobes and aerobes respectively.

Heretofore, especially in small plants such as those for dwelling houses, difficulty has been encountered in properly fostering and propagating the aerobes or rather in supplying those conditions with which they should be surrounded to insure their multiplication and existence. These micro-organisms find their home in the filter bed where the last step in the purification of the sewage takes place and it has been found that these bacteria will die without air or oxygen.

One object of this invention is to supply in a positive manner air into and throughout the filter bed in which the aerobic action is to take place and particularly to supply it to the lower portion of the bed. To this end the comparatively pure portion of the waste from a dwelling house is separated from the sewage, for example, the kitchen sink and wash tubs are not connected into the soil pipe for the closets but may first be connected through a grease trap to a flush tank located in the lower portion of the house but at as great an elevation above the filter bed as possible. A perforated aerating duct is embedded in the filter bed, preferably near the bottom, and is connected to the flush tank by an imperforate duct. A fresh air inlet is connected to this imperforate duct at a point between the filter bed and the flush tank preferably as near the flush tank as possible. The flush tank has such provisions that it will automatically discharge its entire liquid contents intermittently into the said imperforate duct. The discharge of the flush tank is sudden and the volume of water such as to fill the imperforate duct like a piston which, as soon as it passes the fresh air inlet, has imprisoned a charge of fresh air measured by the contents of the ducts ahead of it. This volume of water in the form of a piston forces the air ahead of it and through the perforations of the perforated aerating duct and automatically aerates the filter bed in a positive manner.

A further object of the invention is to provide for a more complete aeration of the liquefied sewage effluent upon leaving the septic tank. To this end aerating steps are built on the partition wall separating the septic tank from the dosing chamber, over which steps the liquid effluent is caused to fall in a thin sheet or spray.

A further object of the invention is to improve in general the construction of sewerage purification apparatus. To this end a single tank is provided preferably circular in cross section having two interior chambers formed by a cross partition, one the septic chamber, which is non-porous and the other the dosing chamber which may preferably be non-porous and which discharges into the filter bed intermittently. This tank has a single cover which is perforated or otherwise designed for the admission of air and light.

It is a further object to provide such apparatus that will conform to the requirements of modern plumbing and conform to modern sanitary laws. To this end the soil pipe for the house may be provided with a fresh air inlet and be separated by a trap from the septic tank.

It is also an objective feature to provide for the escape of all possibly odorous gases at the far end of the apparatus and not through the soil pipe of the house.

A further object is to provide for the supply of comparatively warm fresh air for the positive aeration of the filter bed to prevent possible freezing.

Still further objects of the invention will also be apparent from the following specification and claims which should be read in connection with the accompanying drawings which illustrate diagrammatically embodiments of the invention, which form part of this application, in which like characters designate corresponding parts, and in which—

Figure 2:
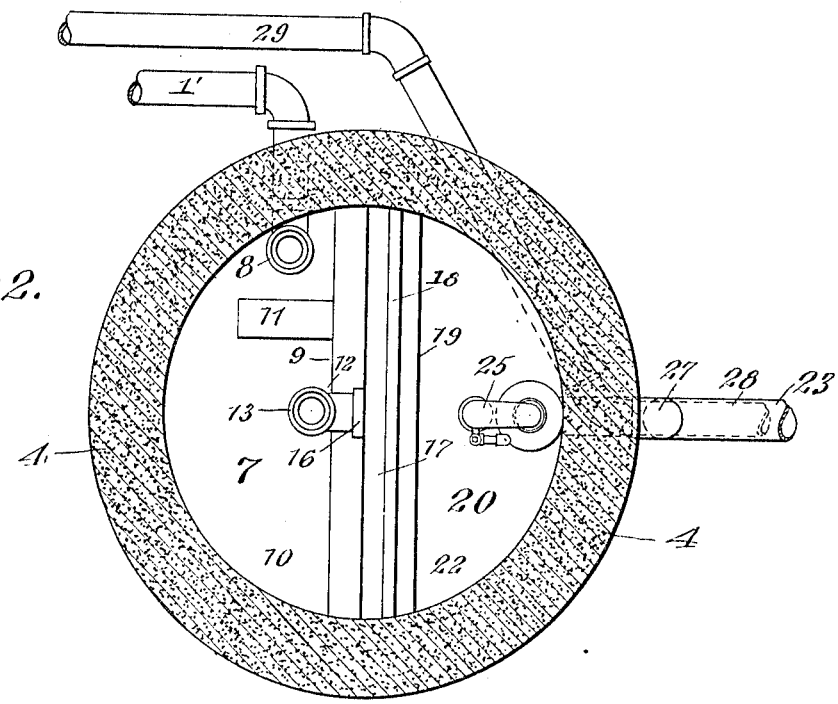
Figure 3:
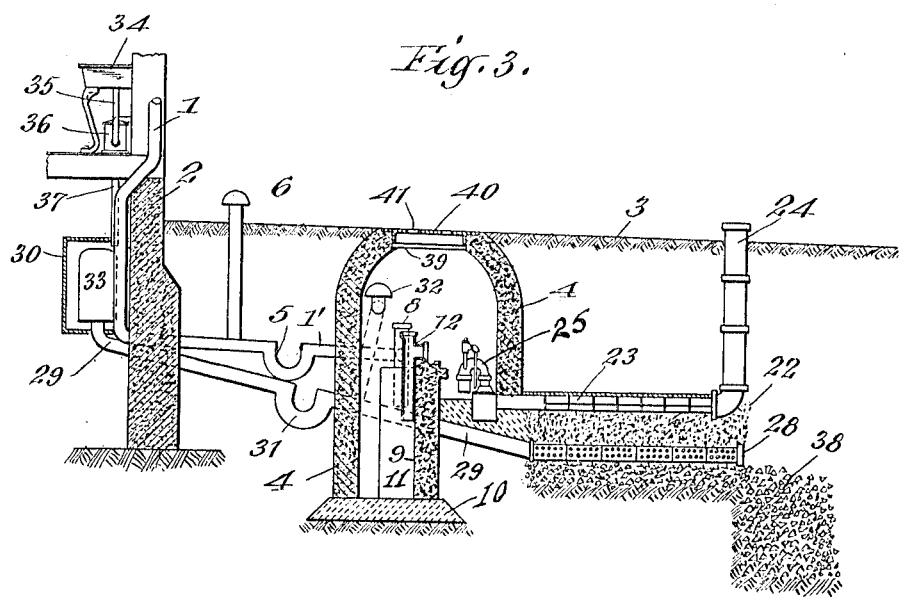

Figure 1 illustrates in diagrammatical vertical section an embodiment of the system; Fig. 2 is an enlarged horizontal section through line II—II of Fig. 1; and Fig. 3 is a view similar to Fig. 1 but showing modifications.

In the figures, 1 indicates the soil pipe for the dwelling house 2. It is to be understood that the soil pipe 1 does not provide means of egress from the building for all its sewage to be disposed of. The closets and other toilet apparatus may empty into it. The kitchen sink, wash tubs, etc., are provided with a separate egress as will hereinafter be described. The soil pipe 1 may be continued through the roof of the house for ventilating purposes, if desired. It is shown extending down sufficiently below the ground level 3 to be below the frost line. The portion 1' extends out from the dwelling with a suitable fall to insure the flow of sewage to the tank 4. If desired the soil pipe 1 may be provided with a trap 5 and also with a fresh air ventilating inlet 6 which may be connected to the soil pipe at any suitable locality. It is shown connected with the portion 1' between the trap 5 and the dwelling house 2. The soil pipe 1 discharges into the septic chamber 7 of the tank 4 and is provided with a non-distributing inflow opening, comprising a vertical section of pipe 8 open at top and bottom and extending down a little short of the middle depth of the septic chamber 7.

The partition wall 9 together with the walls of the tank 4 and the floor 10 complete the masonry construction for the septic tank 7 which as illustrated may be approximately semi-circular in cross section. The masonry construction may be brick, concrete, reinforced concrete or of any approved construction. However, it is desirable that the walls of the septic chamber 7 be impervious to the penetration of water to prevent the seepage of its sewage contents.

A baffle wall 11 is shown extending out from the partition wall 9 between the inflow 8 and the middle of the septic chamber. This baffle wall does not extend completely across the chamber but just a sufficient distance to aid the inflow 8 in preventing any considerable disturbance of the contents of the septic chamber 7 and to prolong the retention of newly entered sewage in the septic chamber 7.

The outflow for the septic chamber 7 may be provided by a branched section 12 having a vertical portion 13 open at both ends 14 and 15, the end 14 extending down to about the middle depth of the septic chamber 7. The effluent after passing into the opening 14 finds its exit from the branch pipe 16 into a horizontal trough 17 provided along the top of the partition wall 9. The sewage overflows the trough 17 falling over a series of steps 18 and 19 and thence into the dosing chamber 20, likewise formed within the tank 4 by the walls of tank 4 and the partition 9 and the floor 21. This dosing chamber is of considerably less depth than the septic chamber 7 and is supplied with light and air.

The filter bed 22, may be formed in any approved manner, preferably in direct contact with the soil, and extending over as large an extent as possible to provide for the requisite amount of seepage. In the filter bed 22 illustrated, 22' indicates the natural soil at the bottom of the bed; $22^2$ indicates one or more bottom layers of coarse filtering material which may be fairly large broken stone; $22^3$ indicates one or more intermediate layers of smaller suitable filtering material as for instance sand and broken stone from one-eighth to three-fourths inch; and $22^4$ indicates a top protecting layer of salt hay, or excelsior. The filter bed is, of course, located preferably below the frost line and may be extended to any length desired according to the seepage facilities furnished by the subsoil 22'. The sewage distributing duct 23 extends along the top portion of the filter bed 22 or may be slightly embedded therein. It may be formed of porous tiles which are shown in the drawings of the hexagonal type and slightly separated at their adjacent ends to provide for the proper escape of the sewage. This duct, however, may be formed in any suitable manner and may be of any suitable construction. It preferably extends throughout the longitudinal extent of the filter bed and may have a suitable fall to provide for the distribution of the sewage. Its far end is provided with a ventilating duct 24 extending to any suitable distance above the ground level 3. The dosing chamber 20 is connected to the duct 23 by means of a siphon which may be of any suitable construction and provides for the intermittent and automatic discharge of substantially the entire contents of the dosing chamber 20 into the duct 23 through the connecting passage 26. An overflow pipe 27 entering into the duct 23 from the dosing chamber 20 may also be provided or omitted as desired. There is also provided another duct or passage in the filter bed 22 which is termed the perforated aerating duct and is indicated by 28. This duct may be formed in any suitable manner as by perforated tile sections or may be any suitably formed passage in the filter bed. It preferably extends through the lower portion of the filter bed throughout its entire longitudinal extent. An imperforate duct 29 connects the aerating duct 28 with a flush tank 30 in the dwelling house 2. A trap 31 for the imperforate duct 29 is illustrated while a fresh air inlet for the duct 29 is indicated by 32 and connects with the duct 29 between the aerating duct 28 and the tank 30, preferably below the trap 31. The automatic discharge of the flush tank into the duct 29 is provided by any suitable form of apparatus, as by the siphon 33 indicated.

The kitchen sink 34, wash tubs and other apparatus from which the sewage is comparatively pure may first be delivered through a sewer pipe 35 separate from the soil pipe 1 and be passed through a suitable grease trap 36 and thence into the flush tank 30 by means of the pipe 37.

In Fig. 3 the fresh air inlet 32 for the imperforate duct 29 is located within the tank 4 the atmosphere within which is usually maintained fairly warm by the sewage decomposition and the overflow 27 is omitted. The filter bed 22 and coöperating ducts have been shown merely in diagram but it is to be understood that they may be extended longitudinally to any desired distance and laterally to any distance and that the ducts 23, 28 etc., may be one or more in number. It is preferable, however, that the longitudinal extent of the bed be increased to provide for the disposal of greater amounts of sewage. It is also immaterial that the filter bed extend straight out from the tank 4 as it may double back on itself or extend in any desired direction throughout its extent.

In the drawings 38 indicates a relief duct for the filter bed which may provide for the outflow of surplus liquid beyond that which is disposed of by seepage in the filter bed proper. This relief duct may be formed by a trench filled with broken stone and leading to any suitable outlet, such as a tank which may be emptied when necessary. The tank 4 containing the septic chamber 7 and the dosing chamber 20 is shown with a single manhole opening 39 at the top which may be provided with a cover 40 of any suitable construction providing for the entrance of light and air as by means of the perforations 21.

Operation: Sewage descends the soil pipe 1, enters the septic chamber 7 through the inflow pipe 8. This septic chamber 7 becomes entirely filled with raw sewage up to the level of the outflow opening 16. The propagation of anaerobic bacteria takes place according to the well known Cameron process until an impervious blanket or scum is formed over and floats upon the sludge in the septic chamber 7. It is this blanket which excludes light and air from the septic chamber 7. The construction of this chamber provides for the continuous non-disturbing inflow of sewage and the continuous non-disturbing outflow of the same after it has been liquefied by the septic or anaerobic action. The second step in the purification also takes place within the tank 4. The outflow from the pipe 16 runs into an horizontal trough 17 and overflows the steps 18 and 19 in the form of a thin sheet or spray where it is thoroughly aerated and falls into the dosing chamber 20. This dosing chamber may be of any suitable depth but it is preferably much shallower than the septic chamber 7 which has a considerable depth to provide for sedimentation. When the dosing chamber 20 is full substantially its entire contents are discharged automatically by the siphon 25 into the distributing duct 23. Whatever foul gases there may have been in the distributing duct 23, they are forced along by the charge of liquid flowing out from the dosing chamber 20 toward the end of the system and out of ventilating duct 24, located preferably at as great a distance as possible from the dwelling 2. When this charge of sewage passes the overflow duct 27, shown in Fig. 1, it creates a partial vacuum behind it. The duct 27 being in direct communication with the interior of tank 4, there is created a partial vacuum therein which is immediately relieved by a supply of fresh air through the ventilating perforations 41. Furthermore the vertical pipe 24 extends to a higher elevation than the cover 40 and the warm gases tending to collect in pipe 23 from oxidation in the filter bed and discharging through the pipe 24 when no sewage is in duct 23 tend to create a circulation of air down through the perforations 41.

The liquid sewage is distributed throughout the top portion of the filter bed 22 by the perforated duct 23 and descends toward the bottom of the bed by gravity. While passing over the filtering material the liquid sewage is finely divided and is brought into contact with air imprisoned in the filter bed. The surfaces of the particles of filtering material foster the micro-organisms of fermentation called aerobes, so that the filter bed may properly be termed an aerobic filter bed. By the time the liquid sewage reaches the bottom of the filter bed it has been satisfactorily purified for all practical purposes and is absorbed by the subsoil 22' according to the well known principles of seepage. After the sewage discharged into the duct 23 from the dosing chamber 20 has found its way into the filter it is obvious that a partial vacuum is formed in the duct 23 which is relieved by the ingress of fresh air from the ventilating duct 24 or from the tank 4 by means of the duct 27 or by both the duct 27 and the duct 24. This air is likewise drawn down into the filter bed 22 to a certain depth as the liquid sewage descends.

It is obvious that the intervals between the discharges of sewage from the dosing chamber 20 may be suitably regulated by properly proportioning the size of the dosing chamber to the rate of sewage delivered from the soil pipe 1. It is preferred that an appreciable time interval between discharges of sewage should occur, in which the filter bed 22 is comparatively free from sewage and its interstices are open for the propagation of aerobic bacteria about the surfaces of the particles of the filtering material. This propagation is greatly furthered by the presence of air or oxygen. It is to be understood at this point that the applicant does not claim to be the first to provide means for supplying air to a perforated pipe or passage in contact with a body of filtering material which, with the perforated pipe or passage is buried beneath the surface of the ground and in direct contact with the surrounding soil, as this was clearly illustrated and described in the patent to Waring No. 535,516, March 12, 1895 and in the patent to Smith No. 784,597, March 14, 1905.

Applicant's special aerating operation should now be considered. The comparatively pure portion of the sewage of the dwelling house 2 is passed through the grease trap from this waste water and practically pure water flows from the pipe 27 into the flush tank 30. The flush tank is so proportioned as to discharge its contents automatically out of phase with the discharge of the dosing chamber 20. Before the flush tank 30 discharges its contents of water the ducts 28 and 29 are empty so far as liquid is concerned but are filled with atmospheric air which has entered through the ventilating opening 32. The sudden discharge of water enters the duct 29 from tank 30. It fills the duct like a piston and as soon as it passes the ventilating opening 32 the entire discharge of air in the ducts 28 and 29 ahead of this water piston is imprisoned and the down flowing water piston forces this charge of fresh air out of the perforations of the perforated aerating duct 28 into the lower portion of the filter bed 23. The air thus forced into the filter bed penetrates into the interstices between the particles of filtering material and tends to rise toward the duct 23. In passing over the surfaces of the particles of filtering material the propagation of aerobic bacteria is stimulated and the rising fresh air has a tendency to displace any odorous gases in the filter bed which find their escape into the duct 23 and thence out of the ventilating opening 24 remote from the dwelling house 2. After the charge of air in the ducts 28 and 29 has been forced into the filter bed the pure water which acted as a piston to expel the air runs out of the perforated duct 28 into the bottom of the filter bed and is removed by seepage, requiring itself little or no purification and having no tendency to clog the filter bed. It is obvious that this charge of water which has flowed from the perforated duct 28 into the filter bed has a tendency to form a partial vacuum in the ducts 28 and 29 which is immediately filled with fresh air from the ventilating duct 32 preparatory to being itself forced into the filter bed upon the next succeeding discharge of the flush tank 30.

It is preferred that the discharge of the dosing chamber 20 occur after the discharge of the flush tank 30 and, of course, while the flush tank 30 is being refilled. This may be accomplished by suitably proportioning the apparatus to suit existing conditions. In case the dwelling house is to be unoccupied during the winter months it will be expedient to empty the various parts of the apparatus of stagnant water as by means of a stop cock such as the stop cock 30' connected to the flush tank 30. The traps 5 and 31 prevent absolutely any foul gases entering the pipes within the dwelling house 2 and the fresh air inlet 6 provides for the ventilation of the soil pipe 1 as is required by the plumbing laws in many States.

Although there have been illustrated and described satisfactory embodiments of the invention, it is to be understood that many variations in the embodiment of such a system and apparatus are contemplated and that many parts of the apparatus are useful both by themselves and in other combinations than those illustrated and described.

What is claimed and what is desired to be secured by United States Letters Patent is:—

1. The combination in apparatus for the purification and disposal of the sewage of dwelling houses, an aerobic filter bed; a passage for the sewage to be purified leading to said filter bed; a flush tank having a suitable water supply; a perforated aerating duct within said filter bed; an imperforate duct connecting said flush tank with said aerating duct; and a fresh air inlet connected to said imperforate duct between said flush tank and said aerating duct; said flush tank having provisions for discharging a volume of water intermittently into said imperforate duct to entrap a charge of air and forcibly aerate the said filter bed.

2. The combination in automatic apparatus for the purification and disposal of the sewage of dwelling houses, an aerobic filter bed; a passage for the sewage to be purified leading to the top portion of the said bed; automatic means comprising discharging apparatus controlled by the sewage discharge from the dwelling for intermittently delivering said sewage into said passage; an aerating duct in the bottom portion of said bed; and automatic means for intermittently forcing air into said bed from said aerating duct.

3. In combination in apparatus for the purification and disposal of the sewage of a dwelling house, a tank containing a septic chamber and a dosing chamber; an aerobic filter bed in contact with and buried in the soil; means for conducting the polluted portion of the sewage into said tank; means for intermittently discharging measured volumes of the effluent from the septic chamber with the top portion of said bed; an aerating duct in the bottom portion of said bed; and means for intermittently discharging measured volumes of the comparatively pure liquid portion of the sewage of the dwelling house into said aerating duct after first serving as a water piston to drive a charge of fresh air out of said aerating duct into said bed.

4. In combination in apparatus for the purification and disposal of the sewage of a dwelling house, a tank containing a septic chamber and a dosing chamber; an aerobic filter bed in contact with and buried in the soil; means for conducting the polluted portion of the sewage into said tank; means for intermittently discharging measured volumes of the effluent from the septic chamber into the top portion of said bed; an aerating duct in the bottom portion of said bed; an imperforate duct having a fresh air inlet at a distance from said filter bed and connected with said aerating duct; and means for intermittently discharging a quantity of the comparatively pure liquid portion of the sewage of the dwelling house into said imperforate duct above said fresh air inlet to entrap a charge of air and force the same out through said aerating duct.

5. In combination in apparatus for the purification and disposal of the sewage of a dwelling house, a tank containing a septic chamber and a dosing chamber; an aerobic filter bed in contact with and buried in the soil; means for conducting the polluted portion of the sewage into said tank; means for intermittently discharging measured volumes of the effluent from the septic chamber with the top portion of said bed; an aerating duct in the bottom portion of said bed; an imperforate duct having a fresh air inlet supplied with air from within said tank and connected with said aerating duct; and means for intermittently discharging a quantity of the comparatively pure liquid portion of the sewage of the dwelling house into said imperforate duct above said fresh air inlet to entrap a charge of air and force the same out through said aerating duct.

6. In a sewage purification plant, a sewage treating tank as a unitary structure comprising exterior walls buried in the ground and extending to the surface thereof; said tank having a manhole opening at the top provided with a perforated cover to admit light and air; a transverse partition wall for said tank extending up from the bottom of the tank and terminating within the same and forming with the walls of the tank a septic chamber on one side and a dosing chamber on the other side, both chambers being readily accessible from the said manhole opening and with the floor of said dosing chamber at a greater elevation than the floor of the septic chamber.

7. In a sewage purification plant, a sewage treating tank as a unitary structure comprising exterior walls buried in the ground and extending to the surface thereof; said tank having a manhole opening at the top provided with a perforated cover to admit light and air; a transverse partition wall for said tank extending up from the bottom of the tank and terminating within the same and forming with the walls of the tank a septic chamber on one side and a dosing chamber on the other side, both chambers being readily accessible from the said manhole opening and with the floor of said dosing chamber at a greater elevation than the floor of the septic chamber; a horizontal trough provided to distribute the overflow from the septic chamber transversely of said tank; and one or more aerating steps to interrupt and aerate the overflow from said trough into the dosing chamber.

8. In a sewage purification plant, a sewage treating tank; as a unitary structure comprising exterior walls buried in the ground and extending to the surface thereof; said tank having a manhole opening at the top provided with a perforated cover to admit light and air; a transverse partition wall for said tank extending up from bottom of the tank and terminating within the same and forming with the walls of the tank a septic chamber on one side and a dosing chamber on the other side, both chambers being readily accessible from the said manhole opening and with the floor of said dosing chamber at a greater elevation than the floor of the septic chamber; and automatic means for suddenly discharging the contents of said dosing chamber.

9. In a sewage purification plant, a sewage treating tank as a unitary structure comprising exterior walls buried in the ground and extending to the surface thereof; said tank having a manhole opening at the top provided with a perforated cover to admit light and air; a transverse partition wall for said tank extending up from the bottom of the tank and terminating within the same and forming with the walls of the tank a septic chamber on one side and a dosing chamber on the other side, both chambers being readily accessible from the said manhole opening and with the floor of said dosing chamber at a greater elevation than the floor of the septic chamber; a horizontal trough provided to distribute the overflow from the septic chamber transversely of said tank; one or more aerating steps to interrupt and aerate the overflow from said trough into the dosing chamber; and automatic means for suddenly discharging the contents of said dosing chamber.

10. The process of purifying and disposing of the sewage of dwelling houses which comprises, initially keeping separate a comparatively pure liquid portion of the sewage from the portion polluted with solid matter; liquefying said solid matter by secluding a pool of the polluted sewage from light, air and agitation to develop a mass of anaerobic bacteria of a character and quantity sufficient to liquefy said solid matter; subjecting said pool to the action of the so cultivated bacteria until the solid organic matter is dissolved; then subjecting the liquid outflow to an aerating operation; then delivering said liquid outflow intermittently and in a flush to the top portion of an aerobic filter bed; subjecting it to the purifying action of the aerobic bacteria in said bed; effecting its disposal from said bed after purification by gravity and seepage; then reviving and cultivating aerobic bacteria in said bed by forcing air into the lower portion of the bed by means of the sudden discharge and gravity fall into the lower portion of said bed through an air entrapping duct of the said comparatively pure portion of the sewage.

11. In the purifying and disposing of sewage, the process of aerating an aerobic filter bed comprising, collecting a quantity of comparatively pure liquid waste and storing it at a higher elevation than the said filter bed; automatically discharging said quantity of liquid suddenly through an air entrapping tubular duct leading to said filter bed; and causing the gravity fall of said liquid to force a charge of air ahead of the liquid into said filter bed.

12. In the purifying and disposing of sewage, the process of aerating an aerobic filter bed comprising, collecting a quantity of comparatively pure liquid waste and storing it at a higher elevation than the said filter bed; automatically discharging said quantity of liquid suddenly through an air entrapping tubular duct leading to said filter bed; causing the gravity fall of said liquid to force a charge of air ahead of the liquid into said filter bed; and removing the said quantity of liquid from the filter bed by seepage; and refilling the said tubular duct with fresh air by the partial vacuum formed by the discharge and removal of said quantity of liquid.

13. In apparatus for the purification of sewage, sewage purifying means; a retention tank for liquid and located at a higher elevation than said sewage purifying means; a tubular duct connecting said tank with said sewage purifying means; provisions for suddenly discharging the liquid contents of said tank into said duct; and a normally open fresh air inlet for said duct intermediate said tank and said purifying means, said duct and said inlet being arranged so that the liquid discharged from said tank will form a liquid piston and force the air in said duct below said fresh air inlet into said purifying means.

14. In apparatus for the purification of sewage, an aerobic filter bed; a retention tank for liquid and located at a higher elevation than said filter bed; a tubular aerating duct connecting said tank with said filter bed; provisions for suddenly discharging the liquid contents of said tank into said duct; a normally open fresh air inlet for said tubular duct near the upper end thereof, said tubular duct and said inlet being arranged so that the suddenly discharged liquid contents of said tank forms a water piston to entrap the air in said tubular duct below said inlet and forces the entrapped air into the said filter bed.

15. In apparatus for the purification of sewage, an aerobic filter bed; a retention tank for liquid and located at a higher elevation than said filter bed; a sink waste pipe discharging into said retention tank; a grease trap for said waste pipe; a tubular aerating duct connecting said tank with said filter bed; provisions for suddenly discharging the liquid contents of said tank into said duct; a normally open fresh air inlet for said tubular duct near the upper end thereof, said tubular duct and said inlet being arranged so that the suddenly discharged liquid contents of said tank forms a water piston to entrap the air in said tubular duct below said inlet and forces the entrapped air into the said filter bed.

16. In apparatus for the purification of sewage, an aerobic filter bed; a retention tank for liquid and located at a higher elevation than the said filter bed; a downwardly inclined tubular duct connecting said tank with said filter bed; provisions for suddenly discharging the liquid contents of said tank into said tubular duct; and a fresh air inlet pipe opening into the top portion of said inclined duct at a locality near said tank.

17. In apparatus for the purification of sewage, a tank providing a dosing chamber for the aeration of sewage; a fresh air inlet for said chamber; and provisions comprising an exhaust duct operated by discharging liquid acting as a water piston for creating a partial vacuum within said chamber and effecting the intake of fresh air through said inlet.

In testimony whereof, I have signed my name to this specification, in the presence of two subscribing witnesses.

FRANK HAMILTON.

Witnesses:
  EDSON B. SAMMIS,
  CHRISTINE E. HANSELMANN.